United States Patent
Walter (10) Patent No.: US 11,458,918 B2
(45) Date of Patent: Oct. 4, 2022

(54) SYSTEMS FOR PREVENTING THE AUTOMATIC RETRACTION OF A SEATBELT

(71) Applicant: Toyota Motor Engineering & Manufacturing North America, Inc., Plano, TX (US)

(72) Inventor: Daniel J. Walter, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 65 days.

(21) Appl. No.: 16/844,096

(22) Filed: Apr. 9, 2020

(65) Prior Publication Data
US 2021/0316685 A1  Oct. 14, 2021

(51) Int. Cl.
| | |
|---|---|
| *B60R 22/46* | (2006.01) |
| *B60R 21/0132* | (2006.01) |
| *B60R 21/013* | (2006.01) |
| *B60R 21/01* | (2006.01) |
| *F16D 69/02* | (2006.01) |

(52) U.S. Cl.
CPC .......... *B60R 21/0132* (2013.01); *B60R 22/46* (2013.01); *B60R 2021/01272* (2013.01); *B60R 2021/01304* (2013.01); *B60R 2021/01317* (2013.01); *F16D 69/025* (2013.01)

(58) Field of Classification Search
CPC ............... B60R 21/0132; B60R 22/46; B60R 2021/01272; B60R 2021/01304; B60R 2021/01317; F16D 69/025
See application file for complete search history.

(56) References Cited

U.S. PATENT DOCUMENTS

| | | |
|---|---|---|
| 4,537,363 A | 8/1985 | Thomas |
| 5,192,035 A | 3/1993 | Dufour |
| 5,242,213 A | 9/1993 | Fohl |
| 5,423,598 A | 6/1995 | Lane, Jr. et al. |
| 5,552,986 A | 9/1996 | Omura et al. |
| 5,588,611 A | 12/1996 | Osumi et al. |
| 5,588,612 A | 12/1996 | Laun |
| 5,624,087 A | 4/1997 | Dick et al. |

(Continued)

OTHER PUBLICATIONS

Tom Harris, "How Seatbelts Work," Online Article, URL: https://auto.howstuffworks.com/car-driving-safety/safety-regulatorydevices/seatbelt3.htm, Apr. 9, 2002.

*Primary Examiner* — Mathew Franklin Gordon
(74) *Attorney, Agent, or Firm* — Dinsmore & Shohl LLP (57) ABSTRACT

Embodiments described herein generally relate to a system for preventing the automatic retraction of a seatbelt. The system generally includes one or more processors, one or more host vehicle status sensors, one or more seatbelt braking mechanisms, and one or more memory modules. The one or more host vehicle status sensors output a status signal that a host vehicle is stopped an off-road driving condition. The one or more memory modules store logic that causes the one or more processors to determine that the host vehicle is in the off-road driving condition based on the status signal output by the one or more host vehicle status sensors and activate the one or more seatbelt braking mechanisms in response to detecting the host vehicle is in the off-road driving condition to prevent automatic retraction of the seatbelt.

15 Claims, 5 Drawing Sheets

(56) References Cited

U.S. PATENT DOCUMENTS

| | | | | |
|---|---|---|---|---|
| 6,550,810 B1* | 4/2003 | Bauer | ................ | B60R 21/0132 |
| | | | | 242/384.2 |
| 2007/0085319 A1* | 4/2007 | Scherzinger | ............ | B60R 22/46 |
| | | | | 280/806 |
| 2013/0009391 A1* | 1/2013 | Miller | .................... | B60R 21/18 |
| | | | | 280/806 |

* cited by examiner

SYSTEMS FOR PREVENTING THE AUTOMATIC RETRACTION OF A SEATBELT

TECHNICAL FIELD

The present specification generally relates to systems for preventing the automatic retraction of a seatbelt and, more specifically, systems for preventing the automatic retraction of a seatbelt in a vehicle.

BACKGROUND

Retractable seatbelts are commonplace in vehicles. However, seatbelts present in production vehicles automatically retract once the seatbelt has become disengaged from the fastener. Automatic seatbelt retraction may not always be desirable, however, if the vehicle comes to a stop on off-road terrain, such as an uneven surface. In such instances, the seatbelt automatically retracts, but may be prevented from extending back to the buckled position even when the user attempts to reengage the seatbelt. While clothespins or other gripping devices may be used to prevent automatic seatbelt retraction, these makeshift systems are unwieldy and may not always function correctly.

SUMMARY

In embodiments, a system for preventing the automatic retraction of a seatbelt is provided. The system includes one or more processors, one or more host vehicle status sensors, one or more seatbelt braking mechanisms, and one or more memory modules. The one or more host vehicle status sensors are communicatively coupled to the one or more processors and output a status signal indicative of the host vehicle being in an off-road driving condition. The one or more seatbelt braking mechanisms are communicatively coupled to the one or more processors and configured to engage a seat belt such to prevent automatic retraction of the seatbelt. The one or more memory modules are communicatively coupled to the one or more processors that store logic that when executed by the one or more processors and cause the one or more processors to determine that the host vehicle is in the off-road driving condition based on the status signal output by the one or more host vehicle status sensors and activate the one or more seatbelt braking mechanisms in response to detecting the host vehicle is in the off-road driving condition to prevent automatic retraction of the seatbelt.

In one or more embodiments, a system for preventing the automatic retraction of a seatbelt is provided. The system includes one or more processors, one or more host vehicle status sensors, one or more seatbelt braking mechanisms, and one or more memory modules. The one or more host vehicle status sensors are communicatively coupled to the one or more processors and output a status signal indicative of the host vehicle being in an off-road driving condition. The one or more seatbelt braking mechanisms are communicatively coupled to the one or more processors and configured to engage a seat belt such to prevent automatic retraction of the seatbelt. The one or more memory modules are communicatively coupled to the one or more processors that store logic that when executed by the one or more processors and cause the one or more processors to determine that the host vehicle is in the off-road driving condition based on the status signal output by the one or more host vehicle status sensors and activate the one or more seatbelt braking mechanisms in response to detecting the host vehicle is in the off-road driving condition to prevent automatic retraction of the seatbelt. The one or more seatbelt braking mechanisms may each include a brake drum, an opening configured to receive a seatbelt retractor shaft coupled to a nonmoving portion of the seatbelt, and an actuator including a brake arm configured to frictionally engage the brake drum to prevent automatic retraction of the seatbelt in response to the one or more processors detecting that the host vehicle is in the off-road driving condition. The one or more seatbelt braking mechanisms provide a braking force that is greater than a seatbelt retraction force provided by an auto-retractor and less than a seatbelt pre-tension force provided by a seatbelt pre-tensioner system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
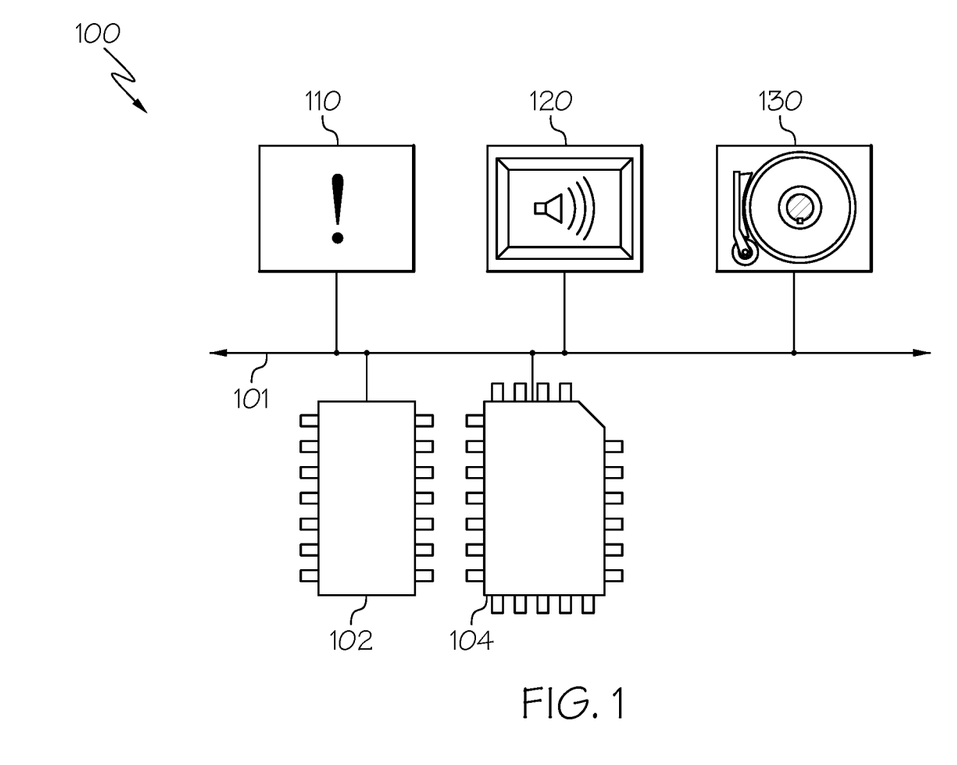
FIG. 1 schematically illustrates an example system for preventing the automatic retraction of a seatbelt, according to one or more embodiments shown and described herein FIG. 2A schematically depicts a top view of an example seatbelt and an example seatbelt braking mechanism, according to one or more embodiments shown and described herein.

Referring generally to FIG. 1, embodiments of the present disclosure are directed to systems for preventing the automatic retraction of a seatbelt. In particular, such automatic retraction prevention may occur when a host vehicle is on off-road terrain, for example, when the host vehicle has come to a stop on an inclined surface, such as a mountain, hill, rock, and the like. In particular, the off-road vehicle, referred to herein as the "host vehicle" includes a system for preventing the automatic retraction of a seatbelt. The system generally includes one or more processors, one or more host vehicle status sensors, one or more seatbelt braking mechanisms, and one or more memory modules. The one or more host vehicle status sensors output a status signal indicative of the host vehicle being in an off-road driving condition. The one or more braking mechanisms are configured to engage a seat belt such to prevent automatic retraction of the seatbelt. The one or more memory modules store logic that cause the one or more processors to determine that the host vehicle is in the off-road driving condition based on the status signal output by the one or more host vehicle status sensors and activate the one or more seatbelt braking mechanisms in response to detecting the host vehicle is in the off-road driving condition to prevent automatic retraction of the seatbelt. Accordingly, the system may prevent the automatic retraction of a seatbelt in the host vehicle. Various embodiments of the system for preventing the automatic retraction of a seatbelt will be described in more detail herein.

Referring now to FIG. 1, a system for preventing the automatic retraction of a seatbelt 100 is schematically illustrated. It is noted that the host vehicle may be any terrestrial, aquatic, or airborne vehicle.

The system for preventing the automatic retraction of a seatbelt 100 may be integrally incorporated into the systems of the host vehicle (e.g., a vehicle infotainment system) or separate therefrom (e.g., an add-on system that may be plugged into the host vehicle). The system for preventing the automatic retraction of a seatbelt 100 includes a communication path 101, one or more processors 102, one or more memory modules 104, one or more host vehicle status sensors 110, one or more seatbelt braking mechanisms 130, and, optionally, one or more user input devices 120. It is noted that while the system for preventing the automatic retraction of a seatbelt 100 illustrates a number of modules communicatively coupled to one another over the communication path 101, a greater or fewer number of modules may be included without departing from the scope of the present disclosure.

As described above, the system for preventing the automatic retraction of a seatbelt 100 includes a communication path 101 that provides data interconnectivity between various modules disposed within the system for preventing the automatic retraction of a seatbelt 100. Specifically, each of the modules can operate as a node that may send and/or receive data. In some embodiments, the communication path 101 includes a conductive material that permits the transmission of electrical data signals to processors, memories, sensors, and actuators throughout the host vehicle warning system 100. In another embodiment, the communication path 101 may be a bus, such as for example a LIN bus, a CAN bus, a VAN bus, and the like. In further embodiments, the communication path 101 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The system for preventing the automatic retraction of a seatbelt 100 may include one or more processors 102 communicatively coupled with one or more memory modules 104. The one or more processors 102 may include any device capable of executing machine-readable instructions stored on a non-transitory computer-readable medium. Accordingly, each processor 102 may include a controller, an integrated circuit, a microchip, a computer, and/or any other computing device.

The one or more memory modules 104 may be communicatively coupled to the one or more processors 102 over the communication path 101. The one or more memory modules 104 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system for preventing the automatic retraction of a seatbelt 100 and/or external to the system for preventing the automatic retraction of a seatbelt 100. The one or more memory modules 104 may be configured to store one or more pieces of logic, as described in more detail below. The embodiments described herein may utilize a distributed computing arrangement to perform any portion of the logic described herein.

Embodiments of the present disclosure may include logic stored on the one or more memory modules 104 that includes machine-readable instructions and/or an algorithm written in any programming language of any generation (e.g., 1 GL, 2 GL, 3 GL, 4 GL, and/or 5 GL), such as, machine language that may be directly executed by the one or more processors 102, assembly language, obstacle-oriented programming (OOP), scripting languages, microcode, and the like that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As noted above, the system for preventing the automatic retraction of a seatbelt 100 may further include one or more host vehicle status sensors 110 coupled to the communication path 101 such that the communication path 101 communicatively couples the one or more host vehicle status sensors 110 to other modules of the system for preventing the automatic retraction of a seatbelt 100. The one or more host vehicle status sensors 110 may include any sensor or combination of sensors configured to output a status signal that a host vehicle is in an off-road driving condition. For example, and not as a limitation, the one or more host vehicle status sensors 110 may include accelerometers, speedometers, vehicle cameras, LIDAR, RADAR, or any combination thereof. For example, an accelerometer or speedometer may provide an output indicative of whether or not the host vehicle is moving. A camera, LiDAR, or RADAR, may provide output indicative of off-road terrain around the host vehicle. Accordingly, using the output of one or more host vehicle status sensors 110, the system for preventing the automatic retraction of a seatbelt 100 may determine that the host vehicle is stopped on off-road terrain. When it is determined that the host vehicle is in the off-road driving condition, the one or more seatbelt braking mechanisms 130 may automatically engage a seat belt such to prevent automatic retraction of the seatbelt.

In some embodiments, the one or more host vehicle status sensors 110 may include sensors configured to output indicative of an off-road driving condition. Such sensors may include, but are not limited to inertial measurement unit sensors, yaw sensors, pitch sensors, tire sensors, or the like. In such embodiments, when the system for preventing the automatic retraction of a seatbelt 100 detects that the host vehicle is in an off-road driving condition, the system for preventing the automatic retraction of a seatbelt 100 may automatically begin monitoring the environment of the host vehicle for other features typically indicative of off-road terrain. In one or more embodiments, determination that the host vehicle is in the off-road driving condition may be determined by detection with the one or more host vehicle status sensors 110 that the host vehicle is in a powered state, at a complete stop, and in an all-wheel drive setting. In at least one embodiments, the one or more host vehicle status sensors 110 may also detect that the host vehicle is parked or in a neutral gear while a parking brake is engaged to further determine the off-road driving condition.

In yet further embodiments, the one or more host vehicle status sensors 110 may include a satellite antenna, the satellite antenna may be configured to receive location signals from GPS satellites. In at least one embodiment, the satellite antenna includes one or more conductive elements that interact with electromagnetic signals transmitted by GPS satellites. The received location signal is transformed into a data signal indicative of the location (e.g., latitude and longitude) of the host vehicle by the one or more processors 102. Based on changes to the location signal, or lack thereof, the system for preventing the automatic retraction of a seatbelt 100 may determine that the host vehicle is in an off-road driving condition. In some embodiments, the system for preventing the automatic retraction of a seatbelt 100 may correlate the received location signal to map information stored on the one or more memory modules 104 or otherwise available to the one or more processors 102 to determine whether the host vehicle is positioned on a mountain, hill, boulder, rock, and the like.

Figure 2A:
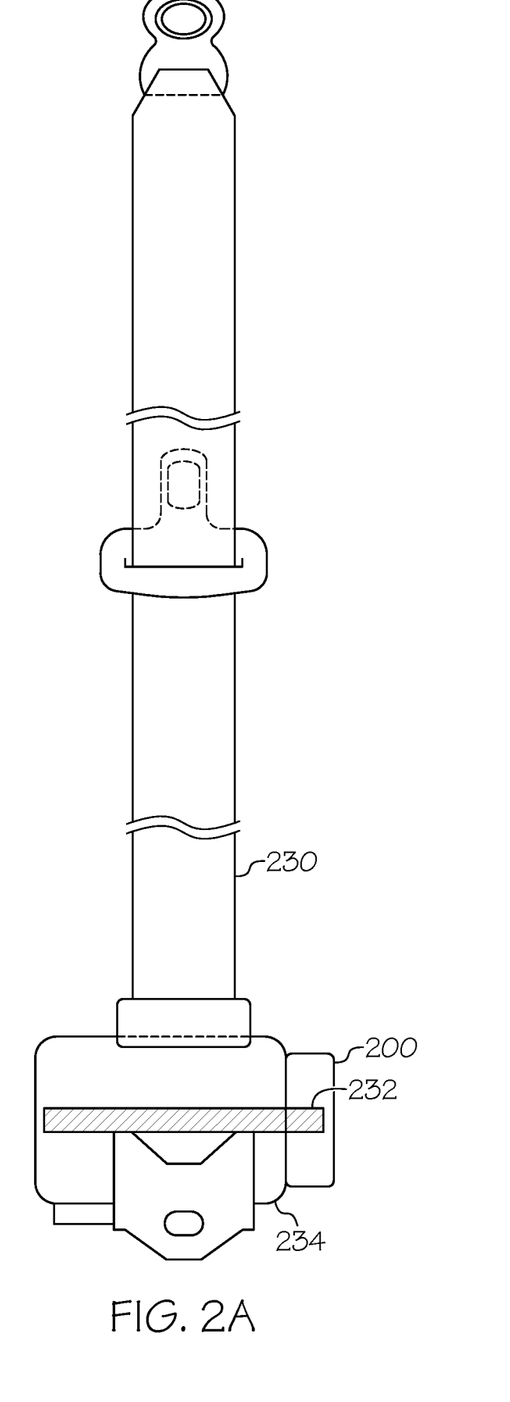
Figure 2B:
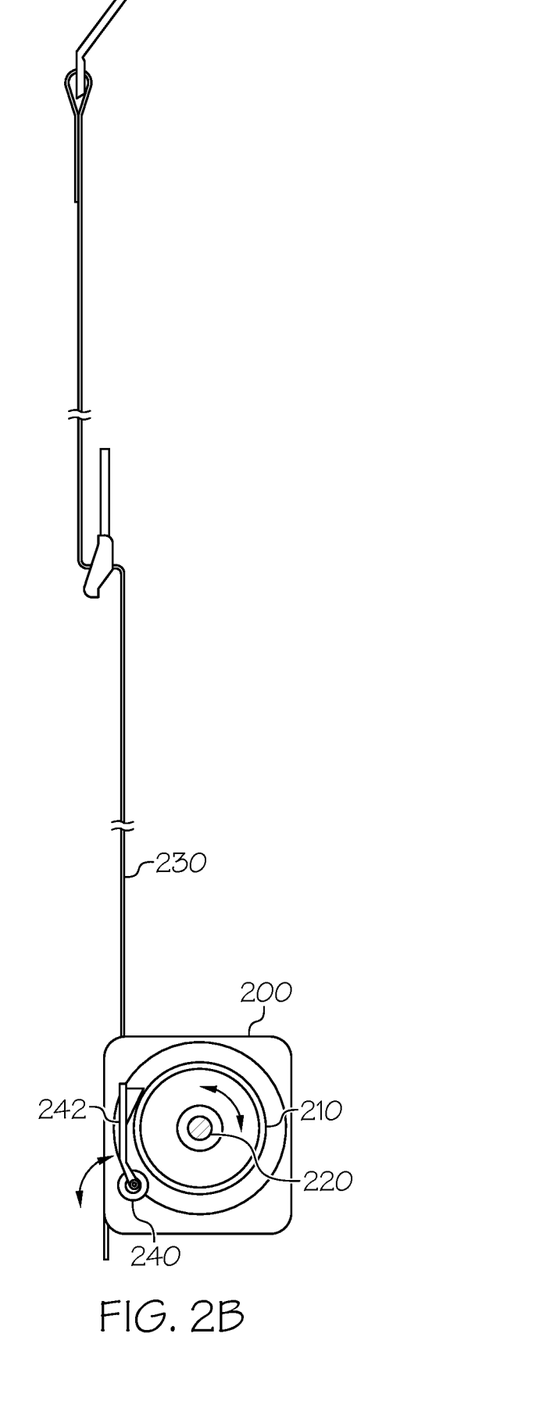
FIG. 2B schematically depicts a side view of an example seatbelt and an example seatbelt braking mechanism, according to one or more embodiments shown and described herein.

Referring now to FIGS. 2A and 2B, an example seatbelt braking mechanism 200 may include a brake drum 210, an opening 220 configured to receive a seatbelt retractor shaft 232 coupled to a nonmoving portion 234 of a seatbelt 230, and an actuator 240 including a brake arm 242 configured to frictionally engage the brake drum 210 to prevent automatic retraction of the seatbelt 230 in response to the one or more processors 102 detecting that the host vehicle is in the off-road driving condition.

Figure 3A:
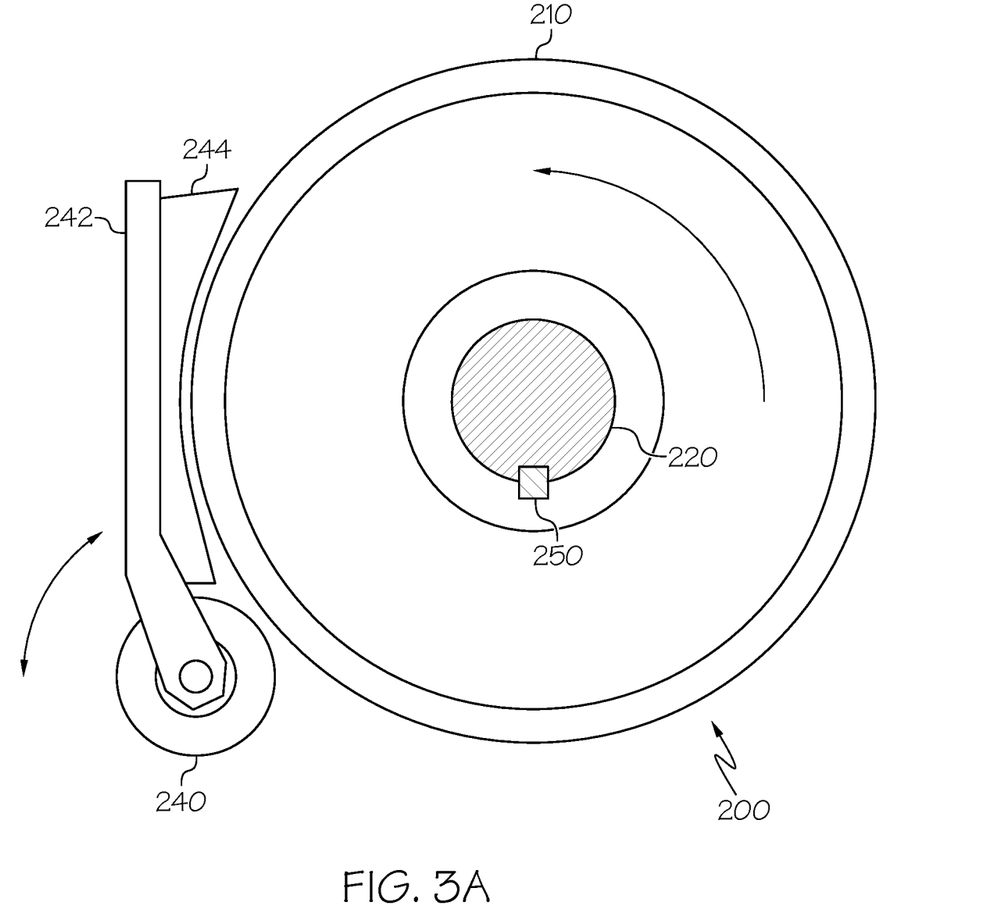
FIG. 3A schematically depicts a top view of an example seatbelt braking mechanism, according to one or more embodiments shown and described herein.
Figure 3B:
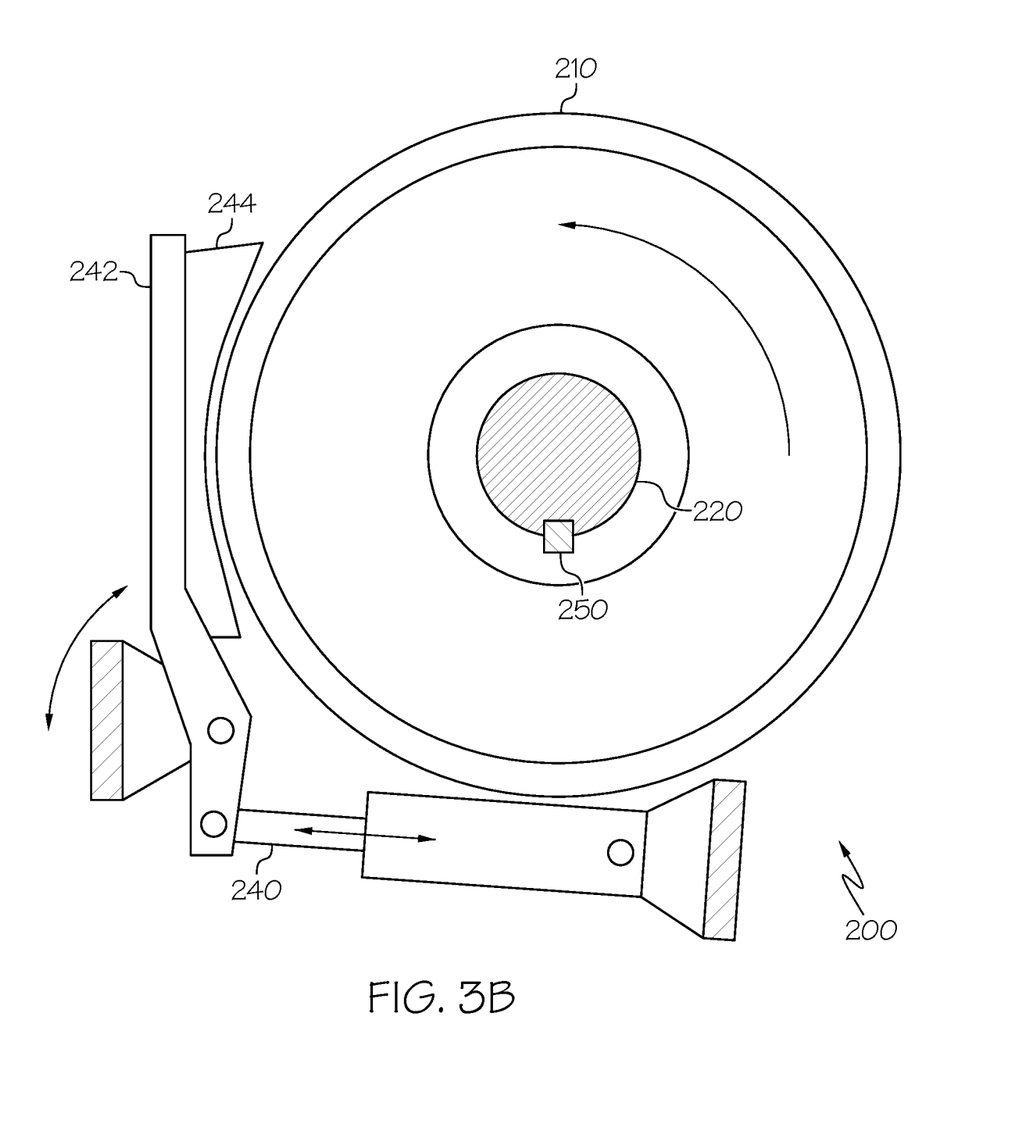
FIG. 3B schematically depicts a top view of an example seatbelt braking mechanism, according to one or more embodiments shown and described herein.

In embodiments, the braking mechanism 200 may be a clasp brake, a band brake, a disk brake, or a drum brake. As shown in FIGS. 3A and 3B, braking mechanism 200 may be a clasp brake having an actuator 240. FIG. 3A shows the actuator 240 as a rotary actuator and FIG. 3B shows the actuator 240 as a linear actuator. Regardless of which embodiment of the clasp brake is selected, the actuator 240 may be activated to move the brake arm 242 to directly frictionally engage the brake drum 210 and prevent the automatic retraction of seatbelt 230 in response to the one or more processors 102 detecting that the host vehicle is in the off-road driving condition. In embodiments, the braking mechanism may further include a keyway 250 to ensure correct orientation between the braking mechanism 200 and the seatbelt 230.

In one or more embodiments, the brake arm 242, the brake drum 210, or both may include a friction material 244 to increase the amount of frictional engagement between the brake arm 242 and the brake drum 210. As shown in FIGS. 3A and 3B, the friction material 244 may be mounted on the brake arm 242 such that friction material 244 directly contacts the drum brake 210 upon activation of the actuator 240. In embodiments, the friction material may include one or more of acetal, nylon, polyphthalamide, polyetheretherketone, polyphenylene sulfide, polybutylene terephthalate, thermoplastic polyimide, polycarbonate, polyetherimide, natural rubber, butyl rubber, styrene-butadiene, nitrile rubber, silicone rubber, chloroprene rubber, and ethylene propylene diene monomer rubber.

Figure 3C:
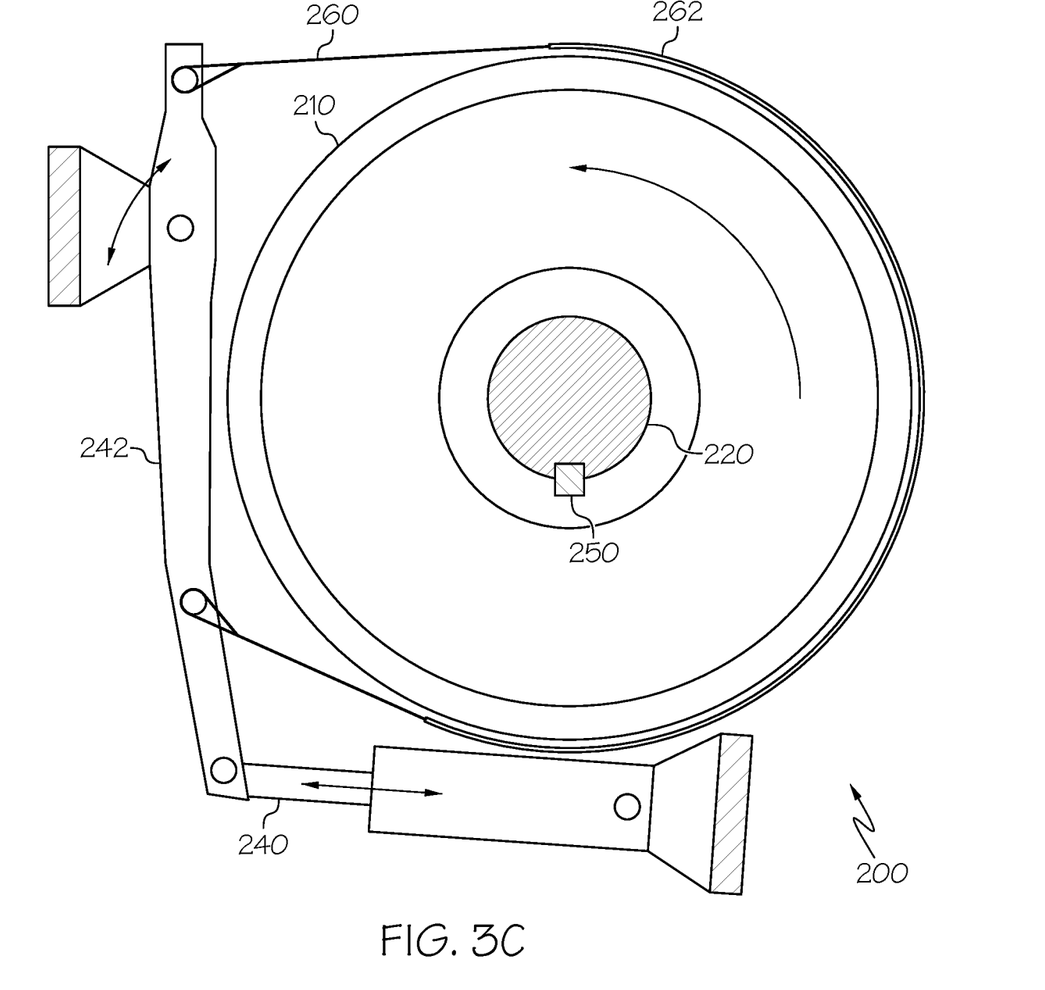
FIG. 3C schematically depicts a top view of an example seatbelt braking mechanism, according to one or more embodiments shown and described herein.

As shown in FIG. 3C, the braking mechanism 200 may be a band brake having a brake band 260 attached to the brake arm 242. Once the actuator 240 is activated, the brake arm 242 may be moved create frictional engagement between the brake drum 210 and the brake band 260 in order to prevent the automatic retraction of seatbelt 230 in response to the one or more processors 102 detecting that the host vehicle is in the off-road driving condition. In such embodiments, the brake arm 242 is configured to indirectly frictionally engage the brake drum 210 through the brake band 260.

When a band brake is selected as the braking mechanism, the brake band 260, the brake drum 210, or both may include a friction material 262 to increase the amount of frictional engagement between the brake band 260 and the brake drum 210. As shown in FIG. 3C, the friction material 262 may be mounted on the brake band 260 such that friction material 262 directly contacts the drum brake 210 upon activation of the actuator 240. In embodiments, the friction material may include one or more of acetal, nylon, polyphthalamide, polyetheretherketone, polyphenylene sulfide, polybutylene terephthalate, thermoplastic polyimide, polycarbonate, polyetherimide, natural rubber, butyl rubber, styrene-butadiene, nitrile rubber, silicone rubber, chloroprene rubber, and ethylene propylene diene monomer rubber.

Regardless of which embodiment of the seatbelt braking mechanism 200 is selected, the seatbelt braking mechanism 200 may provide a braking force that is greater than a seatbelt retraction force provided by an auto-retractor and less than a seatbelt pre-tension force provided by a seatbelt pre-tensioner system. This braking force ensures that the seatbelt 230 will function properly when the seatbelt 230 experiences large amounts of force (e.g., during an accident) or during normal retraction of the seatbelt 230 in an on-road driving condition. As a non-limiting example, the braking force provided by the seatbelt braking mechanism 200 may be from 25 Newtons to 200 Newtons, or any subrange therebetween.

Referring again to FIG. 1, the system for preventing the automatic retraction of a seatbelt 100 may further include one or more user input devices 120 that are communicatively coupled to the one or more processors 102. The one or more user input devices 120 may be configured to activate the one or more seatbelt braking mechanisms 120. In other words, the one or more user input devices 120 may allow a user (e.g., the driver) of the host vehicle to manually activate the one or more seatbelt braking mechanisms 120 to prevent the automatic retraction of a seatbelt. Manual activation of the one or more seatbelt braking mechanisms 120 may be desirable if the required threshold for determining an off-road driving condition is not met, but preventing the automatic retraction of a seatbelt is nonetheless preferred. The one or more user input devices 120 may include a button, a switch, a knob, a microphone, a toggle, a mobile device, and/or similar systems that allow a user to input information to the one or more processors 102.

It should now be understood that embodiments of the present disclosure are directed to systems for preventing the automatic retraction of a seatbelt. In particular, such systems may be activated when a host vehicle is in an off-road driving condition such as, for example, when the host vehicle is stopped on an inclined surface. In particular, the off-road vehicle, referred to herein as the "host vehicle" includes a system for preventing the automatic retraction of a seatbelt. The system generally includes one or more processors, one or more host vehicle status sensors, one or more seatbelt braking mechanisms, and one or more memory modules. The one or more host vehicle status sensors output a status signal that a host vehicle is stopped an off-road driving condition. The one or more memory modules store logic that causes the one or more processors to determine that the host vehicle is in an off-road driving condition based on the status signal output by the one or more host vehicle status sensors and activate the one or more seatbelt braking mechanisms in response to detecting the host vehicle is in the off-road driving condition to prevent automatic retraction of the seatbelt. Accordingly, automatic retraction of a seatbelt may be prevented by the one or more seatbelt braking mechanisms when the host vehicle is determined to be in an off-road driving condition.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for preventing the automatic retraction of a seatbelt, the system comprising:
   one or more processors;
   one or more host vehicle status sensors communicatively coupled to the one or more processors, wherein the one or more host vehicle status sensors output a status signal indicative of the host vehicle being in an off-road driving condition;
   one or more seatbelt braking mechanisms communicatively coupled to the one or more processors and comprising an opening to receive an auto-retractor for a seatbelt and a break arm operatively coupled to the auto-retractor to prevent automatic retraction of the seatbelt; and
   one or more memory modules communicatively coupled to the one or more processors that store logic that when executed by the one or more processors cause the one or more processors to:
      determine that the host vehicle is in the off-road driving condition based on the status signal output by the one or more host vehicle status sensors; and
      activate the one or more seatbelt braking mechanisms in response to detecting the host vehicle is in the off-road driving condition to prevent automatic retraction of the seatbelt.

2. The system of claim 1, wherein determination that the host vehicle is in the off-road driving condition is determined by detection with the one or more host vehicle status sensors that the host vehicle is:
   in a powered state;
   at a complete stop; and
   in an all-wheel drive setting.

3. The system of claim 2, wherein the complete stop is determined by the host vehicle being (a) parked or (b) in a neutral gear while the parking brake is engaged.

4. The system of claim 1, wherein the one or more seatbelt braking mechanisms comprise at least one of a clasp brake, a band brake, a disk brake, or a drum brake.

5. The system of claim 1, wherein the one or more seatbelt braking mechanisms provide a braking force that is greater than a seatbelt retraction force provided by an auto-retractor and less than a seatbelt pre-tension force provided by a seatbelt pre-tensioner system.

6. The system of claim 5, wherein the braking force is from 25 Newtons to 200 Newtons.

7. The system of claim 1, wherein the one or more seatbelt braking mechanisms comprise:
   a brake drum; and
   an actuator coupled to the brake arm, wherein the brake arm is pivotable to frictionally engage the brake drum to prevent automatic retraction of the seatbelt in response to the one or more processors detecting that the host vehicle is in the off-road driving condition.

8. The system of claim 7, wherein the brake arm is configured to directly frictionally engage the brake drum.

9. The system of claim 7, wherein the brake arm is configured to indirectly frictionally engage the brake drum through a brake band.

10. The system of claim 7, wherein the brake arm, the brake drum, or both comprise a friction material to increase the amount of frictional engagement between the brake arm and the brake drum.

11. The system of claim 10, wherein the friction material comprises one or more of acetal, nylon, polyphthalamide, polyetheretherketone, polyphenylene sulfide, polybutylene terephthalate, thermoplastic polyimide, polycarbonate, polyetherimide, natural rubber, butyl rubber, styrene-butadiene, nitrile rubber, silicone rubber, chloroprene rubber, and ethylene propylene diene monomer rubber.

12. The system of claim 7, wherein the actuator comprises a rotary actuator or a linear actuator.

13. The system of claim 1, further comprising one or more user input devices communicatively coupled to the one or more processors, wherein the one or more user input devices are configured to activate the one or more seatbelt braking mechanisms.

14. The system of claim 13, wherein the one or more user input devices include at least one of a button, a switch, a knob, a microphone, a toggle, and a mobile device.

15. A system for preventing the automatic retraction of a seatbelt, the system comprising:
   one or more processors;
   one or more host vehicle status sensors communicatively coupled to the one or more processors, wherein the one or more host vehicle status sensors output a status signal indicative of the host vehicle being in an off-road driving condition;
   one or more seatbelt braking mechanisms communicatively coupled to the one or more processors and configured to engage a seat belt such to prevent automatic retraction of the seatbelt; and
   one or more memory modules communicatively coupled to the one or more processors that store logic that when executed by the one or more processors cause the one or more processors to:
      determine that the host vehicle is in an off-road driving condition based on the status signal output by the one or more host vehicle status sensors; and
      activate the one or more seatbelt braking mechanisms in response to detecting the host vehicle is in the off-road driving condition to prevent automatic retraction of the seatbelt, wherein:
      the one or more seatbelt braking mechanisms comprise:
         a brake drum;
         an opening configured to receive an auto-retractor for a seatbelt; and
         an actuator comprising a brake arm configured to frictionally engage the brake drum to prevent automatic retraction of the seatbelt in response to the one or more processors detecting that the host vehicle is in the off-road driving condition; and the one or more seatbelt braking mechanisms provide a braking force that is greater than a seatbelt retraction force provided by an auto-retractor and less than a seatbelt pre-tension force provided by a seatbelt pre-tensioner system.

\* \* \* \* \*